United States Patent
Panther et al.

(10) Patent No.: US 9,013,265 B2
(45) Date of Patent: Apr. 21, 2015

(54) SYSTEM AND METHOD FOR MONITORING AND CONTROLLING A TARGET OPERATING DEVICE OF A PROCESS CONTROL SYSTEM

(75) Inventors: Mitchell S. Panther, Marshalltown, IA (US); Kurtis K. Jensen, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 228 days.

(21) Appl. No.: 13/434,436

(22) Filed: Mar. 29, 2012

(65) Prior Publication Data

US 2013/0257585 A1    Oct. 3, 2013

(51) Int. Cl.
    *G05B 19/02*    (2006.01)
    *G05B 19/042*   (2006.01)
(52) U.S. Cl.
    CPC .. *G05B 19/0428* (2013.01); *G05B 2219/31162* (2013.01)
(58) Field of Classification Search
    CPC .... B60R 25/00; B64D 11/0015; H04H 20/62; H04H 20/76; H04H 60/15
    USPC ........................ 340/4.34, 573.1, 539.1, 870.1
    See application file for complete search history.

(56) References Cited

U.S. PATENT DOCUMENTS

| | | | |
|---|---|---|---|
| 6,301,235 B1 * | 10/2001 | Raaf et al. ..................... 370/332 |
| 6,366,217 B1 * | 4/2002 | Cunningham et al. ... 340/870.31 |
| 6,529,723 B1 * | 3/2003 | Bentley ......................... 455/405 |
| 7,173,543 B2 * | 2/2007 | Muhr et al. .............. 340/870.07 |
| 2002/0158775 A1 * | 10/2002 | Wallace ................... 340/870.07 |
| 2004/0061604 A1 * | 4/2004 | Giles ........................... 340/539.1 |
| 2005/0212677 A1 * | 9/2005 | Byrne et al. .................. 340/574 |
| 2006/0202848 A1 * | 9/2006 | Volodarsky ................... 340/654 |
| 2010/0114347 A1 * | 5/2010 | Dheenathayalan et al. .... 700/97 |
| 2013/0021167 A1 * | 1/2013 | Harper, Jr. ............... 340/870.01 |

FOREIGN PATENT DOCUMENTS

WO    WO-2013/012851 A1    1/2013

OTHER PUBLICATIONS

Rosemount 702 Wireless Discrete Transmitter, Product Data Sheet, 00813-0100-4702, Rev 'HA (2013).

(Continued)

*Primary Examiner* — Jennifer Mehmood
*Assistant Examiner* — Rufus Point
(74) *Attorney, Agent, or Firm* — Marshall, Gerstein & Borun LLP

(57) ABSTRACT

A method of monitoring and controlling a target operating device of a process control system. The method comprises: detecting activation of one or more parts of the target operating device with a sensor of a wireless latching unit; latching a switch of the wireless latching unit from an active state to an inactive state upon detecting the activation of the one or more parts; transmitting one or more active signals from the wireless latching unit to abuse station upon latching the switch to the active state; detecting deactivation of the one or more parts of the target operating device with the sensor of the wireless latching unit; ignoring the detected deactivation at the wireless latching unit; and continuing to transmit the one or more active signals from the wireless latching unit to the base station. A wireless monitoring and control system is also disclosed.

21 Claims, 4 Drawing Sheets

(56) References Cited

OTHER PUBLICATIONS

International Search Report and Written Opinion for Application No. PCT/US2013/034039, dated Aug. 2, 2013.

International Preliminary Report on Patentability and Written Opinion from International Application No. PCT/US2013/034039, dated Oct. 1, 2014.

* cited by examiner

SYSTEM AND METHOD FOR MONITORING AND CONTROLLING A TARGET OPERATING DEVICE OF A PROCESS CONTROL SYSTEM

FIELD OF TECHNOLOGY

The present disclosure relates generally to process control systems and, more particularly, to monitoring and controlling a target operating device of a process control system.

BACKGROUND

Process control systems, like those used in chemical, petroleum or other processes, typically include one or more centralized or decentralized process controllers communicatively coupled to at least one host or operator workstation and to one or more process control and instrumentation devices such as, for example, field devices, via analog, digital or combined analog/digital buses. Field devices, which may be, for example, valves, valve positioners, switches, transmitters, and sensors (e.g., temperature, pressure, and flow rate sensors), are located within the process plant environment, and perform functions within the process such as opening or closing valves, measuring process parameters, increasing or decreasing fluid flow, etc. Smart field devices such as field devices conforming to the HART®. protocol may also perform control calculations, alarming functions, and other control functions commonly implemented within the process controller.

Information from the field devices and the process controllers is typically made available to one or more other hardware devices such as, for example, operator workstations, maintenance workstations, personal computers, handheld devices, data historians, report generators, centralized databases, etc. to enable an operator or a maintenance person to perform desired functions with respect to the process such as, for example, changing settings of the process control routine, modifying the operation of the control modules within the process controllers or the smart field devices, viewing the current state of the process or of particular devices within the process plant, viewing alarms generated by field devices and process controllers, simulating the operation of the process for the purpose of training personnel or testing the process control software, diagnosing problems or hardware failures within the process plant, etc.

A process control system also typically includes various safety stations, e.g., safety showers, eye wash stations, located throughout the process plant to be used by workers in emergency situations. Operators of the process control system want to know when an event occurred, such as when a safety station is being used, so that a monitoring system is aware of the event. Operators also want to know about when an event occurred so that the monitoring system will continuously broadcast to a workstation that the event occurred, even when the safety station is reset to its original state, e.g., when the safety station is not being used.

One prior solution has used two devices to accomplish these objectives. More specifically, a first instrument has been secured to the safety station and used to perform a mechanical switch state diagnostic and latch if a detected activation of the one or more parts of the safety station occurs, e.g., the shower was turned on. A second instrument has also been secured to the safety station adjacent to the first instrument and reads the switch states of the first instrument. The second instrument, such as a wireless transmitter, then wirelessly broadcasts or transmits the first instrument switch states to a base station of the process control system. In this case, the mechanical latch of the first instrument must be reset by someone going out to the safety station and physically resetting the mechanical switch. In the event that the target operating device is a safety shower station, for example, the two instruments make sure someone is deployed to the scene to determine if anyone is injured, for example.

SUMMARY OF THE DISCLOSURE

One example of the present disclosure includes a method of monitoring and controlling a target operating device of a process control system that includes detecting activation of one or more parts of the target operating device with a sensor of a wireless latching unit and latching a switch of the wireless latching unit from an inactive state to an active state upon detecting the activation of the one or more parts. The method further includes transmitting one or more active signals from the wireless latching unit to a base station upon latching the switch to the active state, and detecting deactivation of the one or more parts of the target operating device with the sensor of the wireless latching unit. The method also includes ignoring the detected deactivation at the wireless latching unit and continuing to transmit the one or more active signals from the wireless latching unit to the base station.

The method of some examples may further comprise configuring the wireless latching unit to relate a position of the one or more parts of the target operating device to a position of a magnet of the target operating device.

Further, detecting activation of one or more parts of the target operating device of some examples may further comprise sensing magnetic pull between the magnet and a Hall effect sensor of the wireless latching unit.

Still further, the method of some examples may further comprise actuating one or more indicators with the base station upon receiving a first of the one or more active signals from the wireless latching unit.

In addition, the method of some examples may also comprise terminating transmission of the one or more active signals from the wireless latching unit upon receiving a termination signal from one of a user interface of the wireless latching unit, the base station, or a hand held device.

Transmitting the one or more active signals of some examples may comprise transmitting one or more wireless signals.

Another example of the present disclosure includes a method of monitoring and controlling a target operating device of a process control system that comprises detecting activation of one or more parts of the target operating device with a sensor of a wireless latching unit and latching a switch of the wireless latching unit from an inactive state to an active state upon detecting the activation of the one or more parts. The method further includes transmitting one or more active signals from the wireless latching unit to a base station upon latching the switch to the active state. The method also includes detecting deactivation of the one or more parts of the target operating device with the sensor of the wireless latching unit and continuing to transmit the one or more active signals from the wireless latching unit to the base station until receiving a termination signal from a second source.

Yet another example of the present disclosure includes a wireless monitoring and control system that comprises a base station comprising a base processor and a base memory, a target operating device comprising one or more parts, and a wireless latching unit communicatively coupled to the target operating device and the base station. The wireless latching unit includes a latch processor, a latch memory, an interface for transmitting data associated with the wireless latching unit to the base station, a sensor for detecting activation and deactivation of one or more parts of the target operating device, and a switch adapted to be latched to an active state upon activation of the one or more parts of the target operating device. The system further comprises a module stored in the latch memory of the wireless latching unit and executable by the latch processor to: (1) detect activation of the one or more parts of the target operating device: (2) latch the switch to the active state when activation of the one or more parts is detected; (3) instruct the interface to transmit one or more active signals from the wireless latching unit to the base station; and (4) ignore deactivation of the one or more parts of the target operating device until receiving a termination signal from a second source that the wireless latching unit has been reset to an inactive state.

Another example of the present disclosure includes a system that comprises a processor, a computer readable storage medium, and computer-executable instructions stored on the computer readable storage medium and executable by the processor to detect activation of one or more parts of the target operating device with a sensor of a wireless latching unit, latch a switch of the wireless latching unit from an inactive state to an active state upon detecting the activation of the one or more parts, and transmit one or more signals from the wireless latching unit to a base station upon latching the switch to the active state. The processor also detects deactivation of the one or more parts of the target operating device with the sensor of the wireless latching unit, ignores the detected deactivation at the wireless latching unit, and continues transmitting the one or more active signals from the wireless latching unit to the base station until receiving a termination signal from a second source.

DETAILED DESCRIPTION OF THE DRAWINGS

Figure 3:
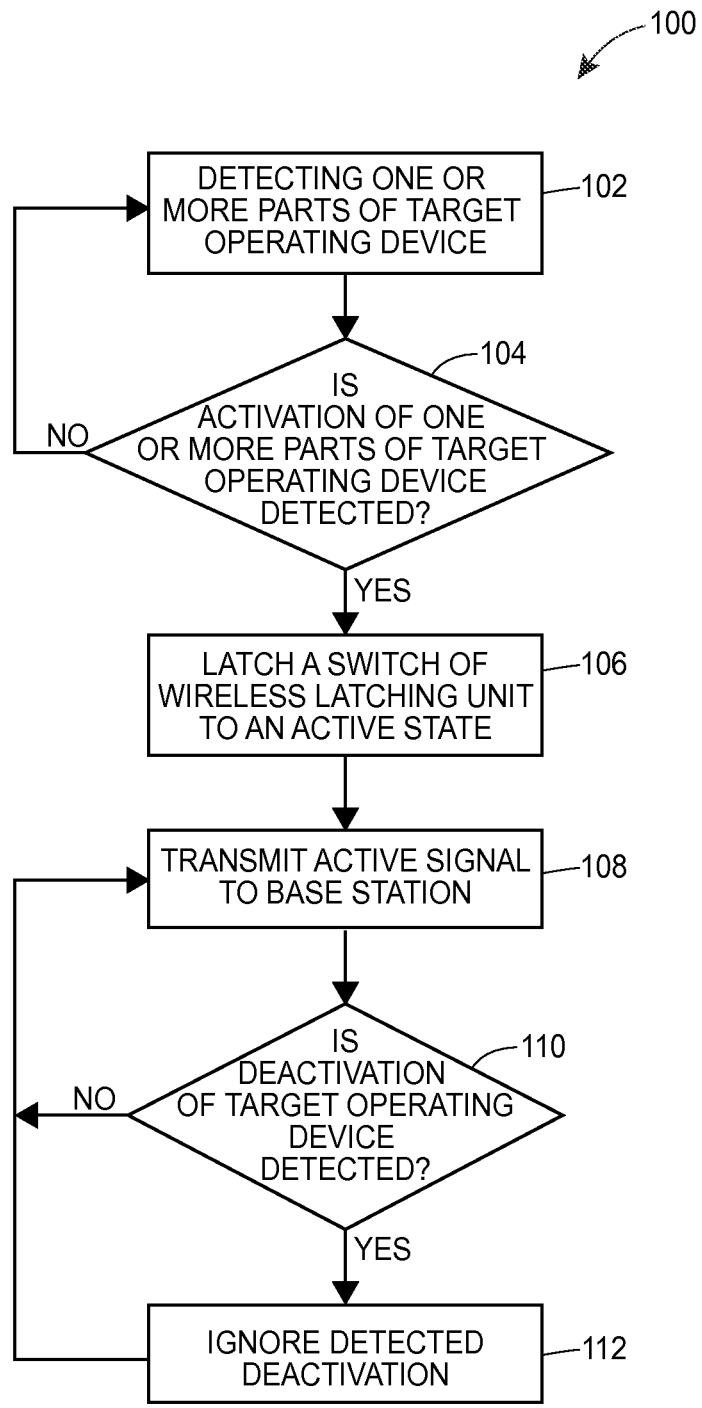
Figure 4:
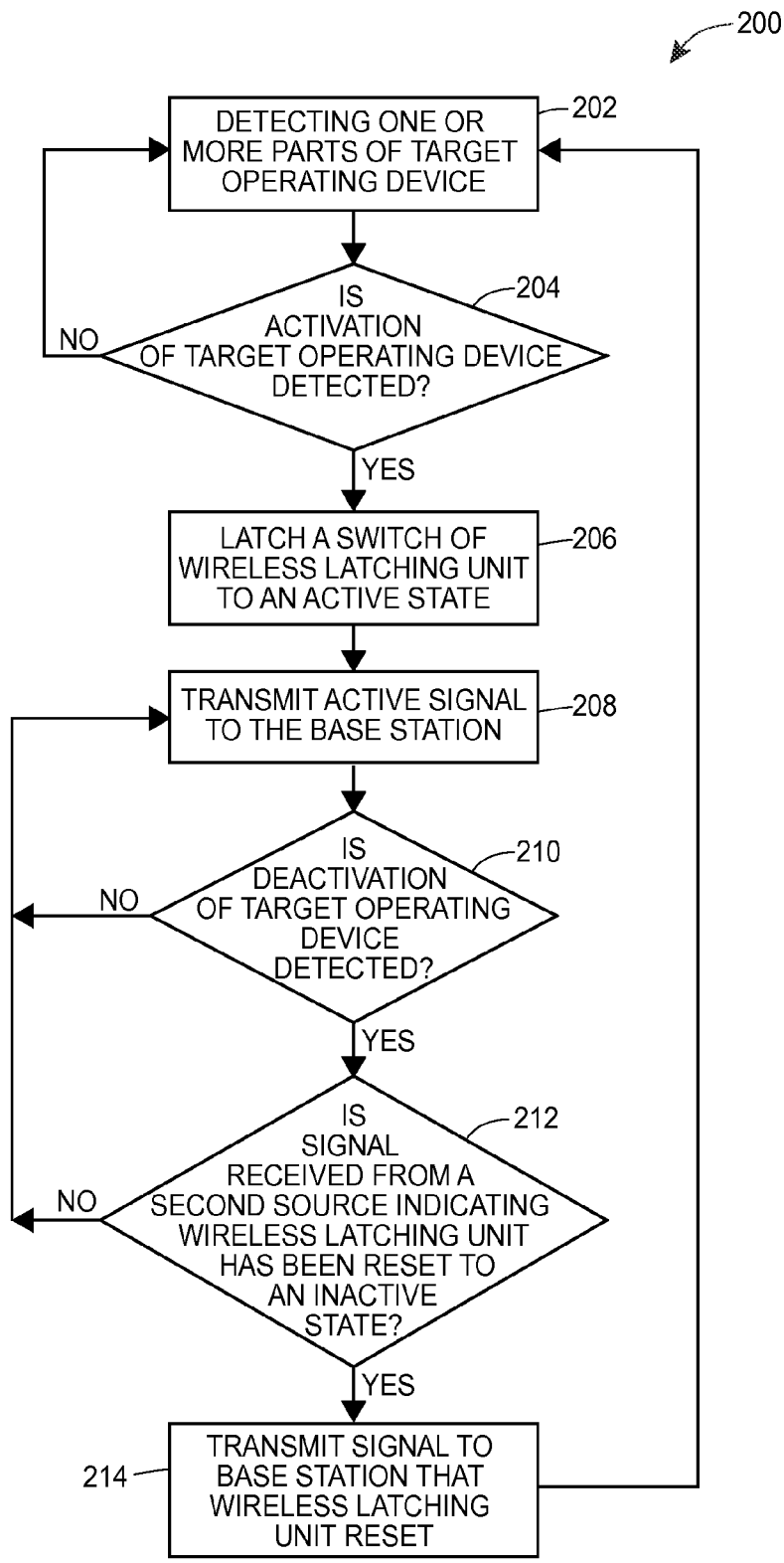

FIG. 3 illustrates an example routine or process flow diagram for monitoring and controlling the target operating device of the process control system constructed in accordance with the principles of the present disclosure; and FIG. 4 illustrates another example routine or process flow diagram for monitoring and controlling the target operating device of the process control system constructed in accordance with the principles of the present disclosure.

DETAILED DESCRIPTION OF THE DISCLOSURE

The present disclosure is directed generally to a wireless system and method for monitoring and controlling a target operating device of a process control system. The system includes abase station comprising a base processor and abuse memory, a target operating device comprising one or more parts, and a wireless latching unit communicatively coupled to the target operating device and the base station. The wireless latching unit includes a latch processor, a latch memory, and an interface for transmitting data associated with the wireless latching unit to the base station. The unit further includes a sensor for detecting activation and deactivation of the one or more parts of the target operating device, and a switch adapted to be latched to an active state upon activation of the one or more parts of the target operating device.

The system performs such control and monitoring of the target operating device by detecting activation of the one or more parts of the target operating device, latching the switch to the active state when activation of the one or more parts is detected, and instructing the interface to transmit one or more active signals from the wireless latching unit to the base station. The system further performs such control and monitoring of the target operating device by ignoring deactivation of the one or more parts of the target operating device until receiving a termination signal from a second source. Alternatively, the system performs such control and monitoring by recognizing deactivation of the one or more operable parts of the target operating device, but continuing transmission of the one or more active signals from the wireless latching unit to the base station until receiving a termination signal from the second source that the wireless latching unit has been reset to an inactive state, for example.

Figure 1:
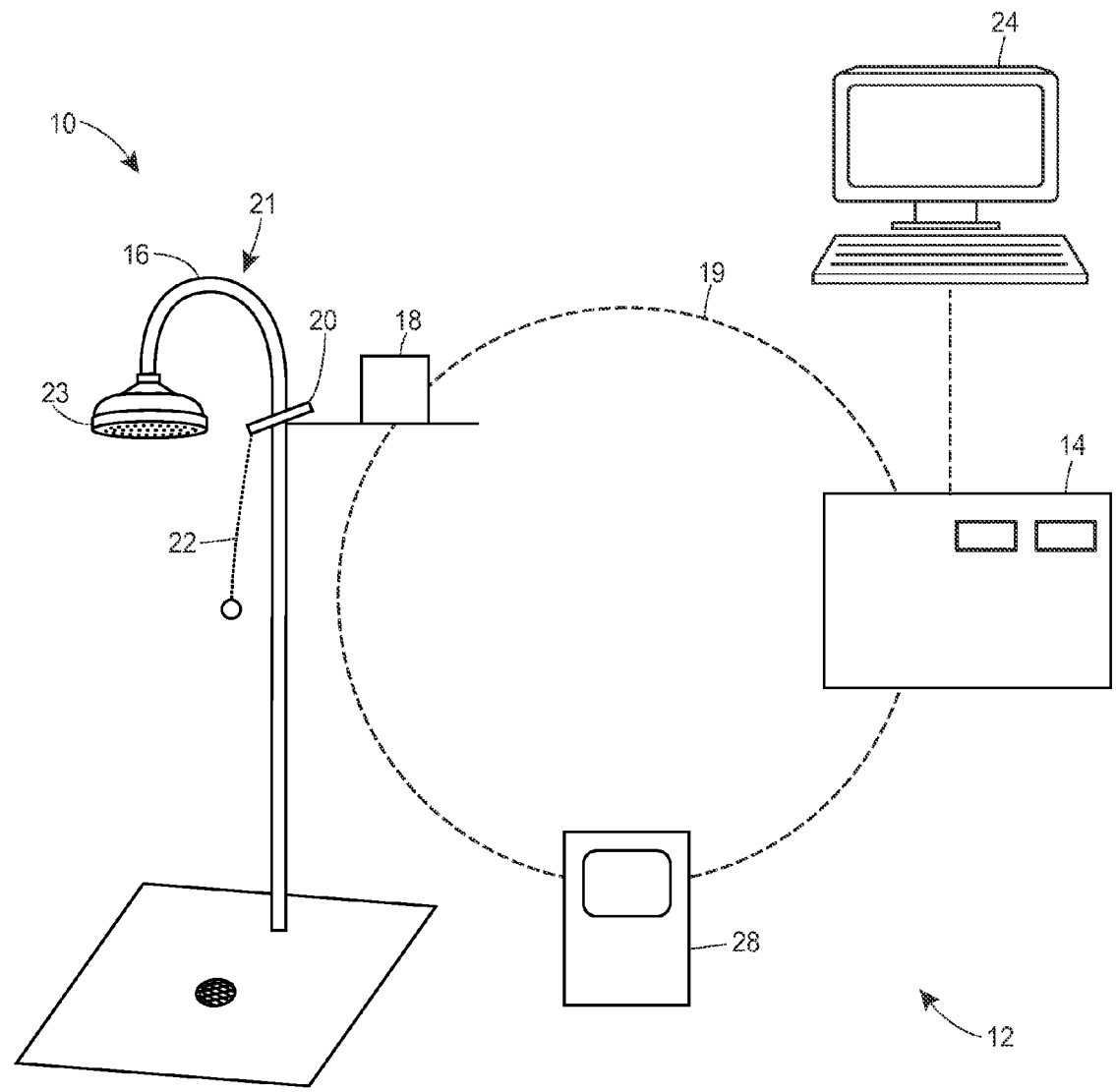
FIG. 1 is an example process control system environment that implements a system and method of monitoring and controlling a target operating device of a process control system constructed in accordance with the principles of the present disclosure.

Referring now to FIG. 1, an example process control environment that implements a system and method of monitoring and controlling a target operating device of a process control system 10 is illustrated. More specifically, the process control system 10 includes a wireless monitoring and control system 12 having abase station 14, a target operating device 16, and a wireless latching unit 18. The wireless latching unit 18 is communicatively coupled to the base station 14 and the target operating device 16 via a wireless network 19. The wireless network 19 may be an Ethernet connection or any other known wireless communication link. The target operating device 16 is a safety shower station and, therefore, includes a water valve (not shown) having one or more parts 21 that can include, for example, a lever 20 that can be actuated by a pull chain 22. When a user desires to operate the safety shower station 16, the user pulls the pull chain 22, which moves the lever 20 to an open position, for example. This movement of the lever 20 turns on the water valve, such that water flows to a shower head 23 of the safety shower station. While the target operating device 16 of FIG. 1 is depicted as a safety shower station, the target operating device 16 may be any one of a variety of other devices, such as an eye wash station or a relief valve of a process control system 10, for example.

As further illustrated in FIG. 1, the base station 14 may also be communicatively coupled to a workstation 24, such as a computer, via the wireless network 19. In addition, the wireless monitoring and control system 12 may further include a hand held device 28 that is communicatively coupled to the base station 14 and the wireless latching unit 18 also via the wireless network 19. The base station 14, the wireless latching unit 18, and the hand held device 28 may each independently act to control the operation of the wireless latching unit 18 and, in effect, the target operating device 16. More specifically, they may each control the transmission of signals from the wireless latching unit 18 to the base station 14, for example, to control the target operating device 16, which is explained in more detail below.

Figure 2:
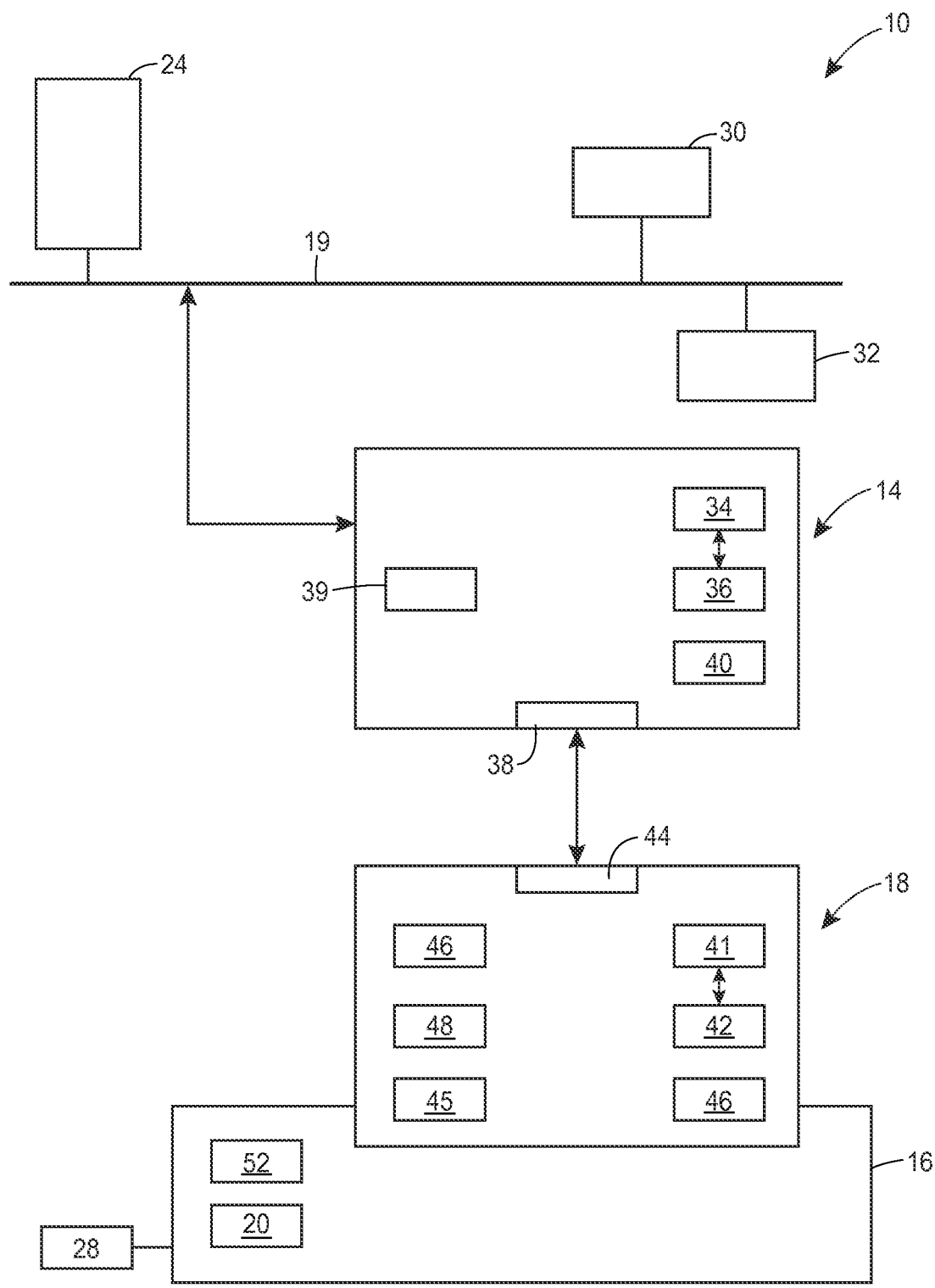
FIG. 2 is a high-level block diagram of a wireless latching unit constructed in accordance with the system of the present disclosure.

Referring now to FIG. 2, the wireless monitoring and control system 12 of the process control system 10 of FIG. 1 is further illustrated as a schematic block diagram. More specifically, in addition to the workstation or computer 24, the base station 14 may also be communicatively coupled via the wireless network 19 to a remote wireless touch screen panel 30 and a paperless recorder unit 32. The remote touch screen panel 30 may remotely operate the base station 14, for example, and the paperless recorder unit 32 may record monitoring and control data received by the base station 14, for example. More specifically, the remote touch screen panel 30 may control the transmission of signals from the base station 14 to the wireless latching unit 18.

FIG. 2 further illustrates component parts of each of the base station 14 and the wireless latching unit 18 of the wireless monitoring and control system 12. The base station 14 includes a base processor 34, a base memory 36, and a base wireless interface 38 for transmitting and receiving data associated with the one or more parts 21 of the target operating device 16 to the wireless latching unit 18, for example. The base station 14 may further include a base power source 39, such as a battery, and a base indicator 40 for indicating an active signal is received from the wireless latching unit 18, as explained in more detail below. The wireless latching unit 18 includes a latch processor 41, a latch memory 42, and a latch interface 44 for transmitting data associated with the wireless latching unit 18 to the base station 14, for example. The wireless latching unit 18 also includes a user interface 45 and a sensor 46 for detecting activation of one or more parts of the target operating device 16, such as the lever 20 (FIG. 1). A switch 48 adapted to be latched to an active state upon activation of one or more parts 21 of the target operating device 16 is also included in the wireless latching unit 18. Activation of one or more parts 21 of the target operating device 16 may be, for example, movement of the lever 20 (FIG. 1) initiated by pulling the pull chain 22 (FIG. 1) to open the water valve (not shown) of the safety shower station.

As also illustrated in FIG. 2, the target operating device 16 further includes a magnet 52 that is disposed on the lever 20 of the valve (not shown). The sensor 46 of the wireless latching unit 18 can be a Hall effect sensor that senses the magnetic pull of the magnet 52, allowing the wireless latching unit 18 to detect activation of the one or more parts 21, such as the lever 20, of the target operating device 16. In other examples, the sensor 46 can include something other than a Hall effect sensor such as, for example, an optical sensor, or any other type of sensor suitable for the intended purpose.

The wireless monitoring and control system 12 may further include a module that is stored in the latch memory 42 of the wireless latching unit 18 and executable by the latch processor 41 to detect activation of one or more parts of the target operating device 16 and latch the switch 48 of the wireless latching unit 18 to the active state when activation is detected. The module then instructs the latch interface 44 to transmit one or more active signals from the wireless latching unit 18 to the base station 14. The module ignores deactivation of the one or more parts 21 of the target operating device 16 until receiving a termination signal from a second source that the wireless latching unit 18 has been reset to an inactive state, for example. Alternatively, the module may recognize deactivation of the one or more operable parts 21 of the target operating device 16, but continue transmitting the one or more active signals from the wireless latching unit 18 to the base station 14 until receiving a termination signal from the second source that the wireless latching unit 18 has been reset to an inactive state. The second source could include one of the base station 14, the remote touch screen panel 30, the workstation 24, and the user interface 45 of the wireless latching unit 18, or some other device.

In another example, the module may also: (1) cease transmission of one or more active signals to the base station 14 upon receiving the termination signal from the second source, and/or (2) transmit an inactive signal to the base station upon receiving the termination signal from the second source. The system 12 may further include a second module that is stored on the base memory 36 and executable by the base processor 34 for transmitting the termination signal to the wireless latching unit 18.

FIG. 3 is a routine or process flow diagram 100 that may be implemented by the wireless monitoring and control system 12 of the process control system 10 of FIGS. 1 and 2, for example, to monitor and control the target operating device 16. Generally, and without specific reference to FIG. 3, the system 10 monitors and controls the target operating device 16 by detecting activation of the one or more parts 21 of the target operating device 16 with the sensor 46 of the wireless latching unit 18 and latching the switch 48 of the wireless latching unit 18 from an inactive state to an active state upon detecting the activation. The system 12 further controls the target operating device 16 by transmitting one or more active signals from the wireless latching unit 18 to the base station 14, the one or more active signals indicating that the switch 48 has been latched to the active state, and detecting deactivation of the one or more parts 21 of the target operating device 16 with the wireless latching unit 18. The system further controls the target operating device 16 by ignoring the detected deactivation at the wireless latching unit 18 and continuing to transmit the one or more active signals from the wireless latching unit 18 to the base station 14.

Now, with reference to FIG. 3, initially a module within the wireless latching unit 18 operates to detect one or more parts 21 of the target operating device 16 (Block 102). For example, this detection occurs via the Hall effect sensor 46 of the wireless latching unit 18 that senses the magnetic pull of the magnet 52 of the target operating device 16. To help effect accurate sensing, the module may first configure the wireless latching unit 18 to relate a position of the one or more parts 21 of the target operating device 16 to a position of the magnet 52 (FIG. 2) of the target operating device 16. Other sensors or position indicators may alternatively be used to sense or detect a position of the one or more parts 21 of the target operating device 16. The module then operates to determine whether activation of the one or more parts 21 of the target operating device 16 is detected (Block 104). The determination of whether activation is detected occurs when the Hall effect sensor 46 of the wireless latching unit 18 senses that the magnetic pull of the magnet 52 reaches a level indicative of activation. If activation is not detected, the module continues detecting one or more parts 21 of the target operation device (Block 102). If activation is detected, then the module latches the switch 48 of the wireless latching unit 18 to an active state (Block 106). After the switch 48 is latched to an active state, the module transmits one or more active signals to the base station 14 (Block 108). More specifically, the module instructs the latch interface 44 of the wireless latching unit 18 to transmit the active signals to the base station 14. The module may also operate to instruct the base station 14 to actuate one or more indicators 39 of the base station 14 upon receiving a first of the one or more active signals from the wireless latching unit 16 (Block 108).

After the module transmits the active signals, the module then determines whether deactivation of the target operating device 16 is detected (Block 110). Like the detection of activation, the detection of deactivation occurs via the Hall effect sensor 46 of the wireless latching unit 18 that senses the magnetic pull of the magnet 52 of the target operating device 16. More specifically, the Hall effect sensor 46 of the wireless latching unit 18 senses that the magnetic pull of the magnet 52 reaches a level indicative of deactivation. If deactivation is not detected, e.g., the magnetic pull of magnet 52 falls below the value or level indicating deactivation, the module continues to transmit the one or more active signals to the base station (Block 108). If deactivation of the target operating device 16 is detected, the module ignores the one or more inactive signals (Block 112) or detected deactivation. Still further, the module may operate to terminate transmission of the one or more active signals from the wireless latching unit 18 upon receiving a termination signal from a user interface of the wireless latching unit 18, the base station 14, the hand held device 28, or some other device. The transmitting of the one or more active signals (Block 108) may include transmitting one or more wireless signals.

Referring now to FIG. 4, an alternative routine or process flow diagram 200 is illustrated. The routine process flow diagram 200 may also be implemented by the wireless control and monitoring system 12 of the process control system 10 of FIGS. 1 and 2, for example, to monitor and control the target operating device 16. Initially, and like the module of routine 100 illustrated in FIG. 3, a module within the wireless latching unit 18 operates to detect one or more parts 21 of the target operating device 16 (Block 202). For example, this detection occurs via the Hall effect sensor 46 of the wireless latching unit 18 that senses the magnetic pull of the magnet 52 of the target operating device 16. To help effect accurate sensing, the module may first configure the wireless latching unit 18 to relate a position of the one or more parts 21 of the target operating device 16 to a position of the magnet 52 (FIG. 2) of the target operating device 16. Other sensors or position indicators may alternatively be used to sense or detect a position of the one or more parts 21 of the target operating device 16. The module then operates to determine whether activation of the one or more parts 21 of the target operating device 16 is detected (Block 204). The determination of whether activation is detected occurs when the Hall effect sensor 46 of the wireless latching unit 18 senses that the magnetic pull of the magnet 52 reaches a level indicative of activation. If activation is not detected, the module continues detecting one or more parts 21 of the target operation device (Block 202). If activation is detected, then the module latches the switch 48 of the wireless latching unit 18 to an active state (Block 206). After the switch 48 is latched to an active state, the module transmits one or more active signals to the base station 14 (Block 208). More specifically, the module instructs the interface 44 of the wireless latching unit 18 to transmit the active signals to the base station 14. The module may also operate to instruct the base station 14 to actuate one or more indicators 39 of the base station 14 upon receiving a first of the one or more active signals from the wireless latching unit 16 (Block 208).

After the module transmits the active signals, the module then determines whether deactivation of the target operating device 16 is detected (Block 210). Like the detection of activation, the detection of deactivation occurs via the Hall effect sensor 46 of the wireless latching unit 18 that senses the magnetic pull of the magnet 52 of the target operating device 16. More specifically, the Hall effect sensor 46 of the wireless latching unit 18 senses that the magnetic pull of the magnet 52 reaches a level indicative of deactivation. If deactivation is not detected, e.g., the magnetic pull of magnet 52 falls below the value/level indicating deactivation, the module continues to transmit the one or more active signals to the base station (Block 208). If deactivation of the target operating device 16 is detected, the module then determines whether a signal is received from the second source indicating the wireless latching unit 18 has been reset to an inactive state (Block 212). If no signal is received from the second source indicating the wireless latching unit 18 has been reset to the inactive state, the module continues to transmit one or more active signals to the base station 14 (Block 208). If, however, a signal is received from the second source indicating the wireless latching unit 18 has been reset to the inactive state, the module transmits a signal to the base station 14 that the wireless latching unit 18 has been reset (Block 214) and then returns to detecting one or more parts of the target operating device 16 (Block 202).

Still further, and also like FIG. 3, the module may operate to terminate transmission of the one or more active signals from the wireless latching unit 18 upon receiving a termination signal from a user interface of the wireless latching unit 18, the base station 14, the hand held device 28, the remote touch screen panel 30 or some other device. The transmitting of the one or more active signals (Block 208) may include transmitting one or more wireless signals.

Although the foregoing description refers to latching the switch 48 of the wireless latching unit 18 from an inactive state to an active state, both the inactive state and the active state may be one of a closed state or an open state, depending upon how the wireless latching unit 18 is configured, for example. As such, latching the switch 48 of the wireless latching unit 18 from an inactive state to an active state may include latching the switch 48 from a closed state to an open state or from an open state to a closed state. In some examples, latching the switch 48 may not actually include latching a switch 48 at all but rather merely changing a value of a software algorithm from 0 to 1, or 1 to 0, or some other similar means. That is, the switch 48 may not be a switch at all, but rather, a mechanism completely constructed out of software.

In a similar manner, the foregoing description also refers to detecting activation and deactivation. Activation and deactivation may refer to movement of one or more parts 21 of the target operating device 16 to an open position or a closed position, depending upon how the target operating device 16 and wireless latching unit 18 are configured. In one example, activation may refer to moving the lever 20 of the target operating device 16 toward an open position (partially or fully), and deactivation may refer to moving the lever 20 of the target operating device 16 toward a closed position (partially or fully closed). In another example, activation may refer to moving the lever 20 of the target operating device 16 toward a closed position (partially or fully), and deactivation may refer to moving the lever 20 of the target operating device 16 toward the open position (whether partially or fully).

While one base station 14 is illustrated in FIG. 1 as part of the wireless monitoring and control system 12 of the process control system 10, the wireless monitoring and control system 12 may alternatively include multiple base stations 14 that are communicably coupled to multiple target operating devices 16, for example, or there may be a single base station 14 and multiple target operating devices 16.

In addition, detecting deactivation of the one or more parts 21 of the target operating device 16 with the wireless latching unit 18 may include detecting that one or more parts 21 of the target operating device 16, e.g., the lever 20, has moved to an inactive or closed state, but the switch 48 of the wireless latching unit 18 has not moved to an inactive or closed state or position. The latch processor 41 of the wireless latching unit 18 then ignores the detected deactivation of the one or more parts 21 of the target operating device 16. Alternatively, the detecting deactivation may include detecting that one or more parts 21 of the target operating device 16, e.g., the lever 20, has moved to an inactive or closed state and latching the switch 48 of the wireless latching unit 18 back to an inactive or closed state. In this example, the latch processor 41 may detect one or more of the inactive or closed state of the lever 20 and the switch 48 of the wireless latching unit 18 and still ignore the detected deactivation.

Certain examples are described herein as including logic or a number of components or modules. Modules may constitute either software modules, e.g., code embodied on a machine-readable medium or in a transmission signal, or hardware modules. A hardware module is a tangible unit capable of performing certain operations and may be configured or arranged in a certain manner. In example embodiments, one or more computer systems, e.g., a standalone, client or server computer system, or one or more hardware modules of a computer system, e.g., a processor or a group of processors, may be configured by software, e.g., an application or application portion, as a hardware module that operates to perform certain operations, as described herein.

In various examples, a hardware module may be implemented mechanically or electronically. For example, a hardware module may comprise dedicated circuitry or logic that is permanently configured, e.g., as a special-purpose processor, such as a field programmable gate array (FPGA) or an application-specific integrated circuit (ASIC), to perform certain operations. A hardware module may also comprise programmable logic or circuitry, e.g., as encompassed within a general-purpose processor or other programmable processor, that is temporarily configured by software to perform certain operations. It will be appreciated that the decision to implement a hardware module mechanically, in dedicated and permanently configured circuitry, or in temporarily configured circuitry, e.g., configured by software, or permanently configured to perform the relevant operations. Whether temporarily or permanently configured, such processors may constitute processor-implemented modules that operate to perform one or more operations or functions. The modules referred to herein may, in some examples, comprise processor-implemented modules.

Similarly, the methods or routines described herein may be at least partially processor-implemented. For example, at least some of the operations of a method may be performed by one or more processors or processor-implemented hardware modules.

Unless specifically stated otherwise, discussions herein using words such as "processing," "computing," "calculating," "determining," "presenting," "displaying," or the like may refer to actions or processes of a machine, e.g., a computer, that manipulates or transforms data represented as physical, e.g., electronic, magnetic, or optical, quantities within one or more memories, e.g., volatile memory, non-volatile memory, or a combination thereof, registers, or other machine components that receive, store, transmit, or display information.

Alternative examples of the structures and methods illustrated herein may be employed without departing from the principles described herein. Thus, while particular examples and applications have been illustrated and described, it is to be understood that the disclosed examples are not limited to the precise construction and components disclosed herein. Various modifications, changes, and variations may be made in the arrangement, operation and details of the method and apparatus disclosed herein without departing from the spirit and scope defined in the appended claims.

What is claimed:

1. A method of monitoring and controlling a target operating device of a process control system, the method comprising:
    detecting activation of one or more parts of the target operating device with a sensor of a wireless latching unit;
    latching a switch of the wireless latching unit from an inactive state to an active state upon detecting the activation of the one or more parts;
    transmitting one or more active signals from the wireless latching unit to a base station upon latching the switch to the active state;
    detecting deactivation of the one or more parts of the target operating device with the sensor of the wireless latching unit;
    ignoring the detected deactivation of the one or more parts of the target operating device with the wireless latching unit; and
    continuing to transmit the one or more active signals from the wireless latching unit to the base station after the detected deactivation until receiving a termination signal from a second source that the wireless latching unit has been reset to an inactive state.

2. The method of claim 1, further comprising configuring the wireless latching unit to relate a position of the one or more parts of the target operating device to a position of a magnet of the target operating device.

3. The method of claim 2, wherein detecting activation of one or more parts of the target operating device further comprises sensing magnetic pull between the magnet and a Hall effect sensor of the wireless latching unit.

4. The method of claim 1, further comprising actuating one or more indicators with the base station upon receiving a first of the one or more active signals from the wireless latching unit.

5. The method of claim 1, further comprising terminating transmission of the one or more active signals from the wireless latching unit upon the wireless latching unit receiving the termination signal from one of a user interface of the wireless latching unit, the base station, or a hand held device.

6. The method of claim 1, wherein transmitting the one or more active signals comprises transmitting one or more wireless signals.

7. A method of monitoring and controlling a target operating device of a process control system, the method comprising:
    detecting activation of one or more parts of the target operating device with a sensor of a wireless latching unit;
    latching a switch of the wireless latching unit from an inactive state to an active state upon detecting the activation of the one or more parts;
    transmitting one or more active signals from the wireless latching unit to a base station upon latching the switch to the active state;
    detecting deactivation of the one or more parts of the target operating device with the sensor of the wireless latching unit; and
    continuing to transmit the one or more active signals from the wireless latching unit to the base station after detected deactivation until receiving a termination signal from a second source that the wireless latching unit has been reset to an inactive state.

8. The method of claim 7, wherein receiving the termination signal from the second source comprises receiving the termination signal from one or more of the base station, a control station or a monitoring station, a user interface of the wireless latching unit, or a hand held communication unit.

9. The method of claim 7, further comprising terminating the transmission of the one or more active signals from the wireless latching unit upon receiving the termination signal.

10. The method of claim 7, further comprising configuring the wireless latching unit to relate a position of one or more parts of the target operating device to a position of a magnet of the target operating device.

11. The method of claim 10, wherein detecting activation of the one or more parts of the target operating device further comprises sensing magnetic pull between the magnet and a Hall effect sensor of the wireless latching unit.

12. The method of claim 7, further comprising actuating one or more indicators with the base station upon receiving a first of the one or more active signals from the wireless latching unit.

13. The method of claim 7, wherein transmitting the one or more active signals comprises transmitting one or more wireless signals.

14. A wireless monitoring and control system comprising:
   a base station comprising a base processor and a base memory;
   a target operating device comprising one or more parts;
   a wireless latching unit communicatively coupled to the target operating device and the base station, the wireless latching unit having a latch processor, a latch memory, an interface for transmitting data associated with the wireless latching unit to the base station, a sensor for detecting activation and deactivation of one or more parts of the target operating device, and a switch adapted to be latched to an active state upon activation of the one or more parts of the target operating device;
   a module stored in the latch memory of the wireless latching unit and executable by the latch processor to: (1) detect activation of the one or more parts of the target operating device; (2) latch the switch to the active state when activation of the one or more parts is detected; (3) instruct the interface to transmit one or more active signals from the wireless latching unit to the base station; and (4) ignore deactivation of the one or more parts of the target operating device until receiving a termination signal from a second source that the wireless latching unit has been reset to an inactive state.

15. The system of claim 14, wherein the sensor is a Hall effect sensor.

16. The system of claim 15, wherein the target operating device includes a magnet disposed on a lever of a valve, and the Hall effect sensor senses a magnetic pull of the magnet.

17. The system of claim 14, wherein the target operating device includes a safety shower, an eye wash station or a relief valve.

18. The system of claim 14, wherein the second source comprises one of the base station, a remote touch screen panel, a workstation, a user interface of the wireless latching unit, or a wired hand held communication device.

19. The system of claim 14, wherein the module may further: (1) cease transmission of the one or more active signals from the wireless latching unit to the base station upon receiving the termination signal from the second source; or (2) transmit an inactive signal to the base station upon receiving the termination signal from the second source.

20. The system of claim 14, further comprising a second module stored on the base memory and executable by the base processor for transmitting the termination signal to the wireless latching unit.

21. A system comprising a processor, a computer readable storage medium, and computer-executable instructions stored on the computer readable storage medium and executable by the processor to:
   detect activation of one or more parts of the target operating device with a sensor of a wireless latching unit;
   latch a switch of the wireless latching unit from an inactive state to an active state upon detecting the activation of the one or more parts;
   transmit one or more active signals from the wireless latching unit to a base station upon the switch being latched to the active state;
   detect deactivation of the one or more parts of the target operating device with the sensor of the wireless latching unit;
   ignore the detected deactivation of the one or more parts of the target operating device at the wireless latching unit; and
   continue to transmit the one or more active signals from the wireless latching unit to the base station after the detected deactivation until receiving a termination signal from a second source that the wireless latching unit has been reset to an inactive state.

* * * * *